Apr. 24, 1923.

C. J. HEPTING 1,452,970

LUGGAGE CARRIER AND TIRE RACK

Filed July 18, 1921

Inventor
Charles J. Hepting

Patented Apr. 24, 1923.

1,452,970

UNITED STATES PATENT OFFICE.

CHARLES J. HEPTING, OF MILWAUKEE, WISCONSIN.

LUGGAGE CARRIER AND TIRE RACK.

Application filed July 18, 1921. Serial No. 485,624.

*To all whom it may concern:*

Be it known that I, CHARLES J. HEPTING, a citizen of the United States, and resident of Milwaukee, in the county of Milwaukee and State of Wisconsin, have invented certain new and useful Improvements in Luggage Carriers and Tire Racks; and I do hereby declare that the following is a full, clear, and exact description thereof.

My invention relates to a new and improved luggage carrier and tire rack, which is, in the present embodiment, designed for attachment to the side car of a motor vehicle, but it will be readily seen that the principle of the invention is also applicable to other vehicles.

In vehicles of this kind, especially when used for long trips, it becomes desirable to conserve the space in which the equipment is carried, and the principal object of the present invention is to so arrange a tire carrier in combination with a luggage carrier that both may take up as little space as possible.

Another important object of the invention is to provide a device of this kind, which may be locked to prevent unauthorized removal of either the tire or the luggage carried by the receptacle which is combined therewith.

Figure 1:
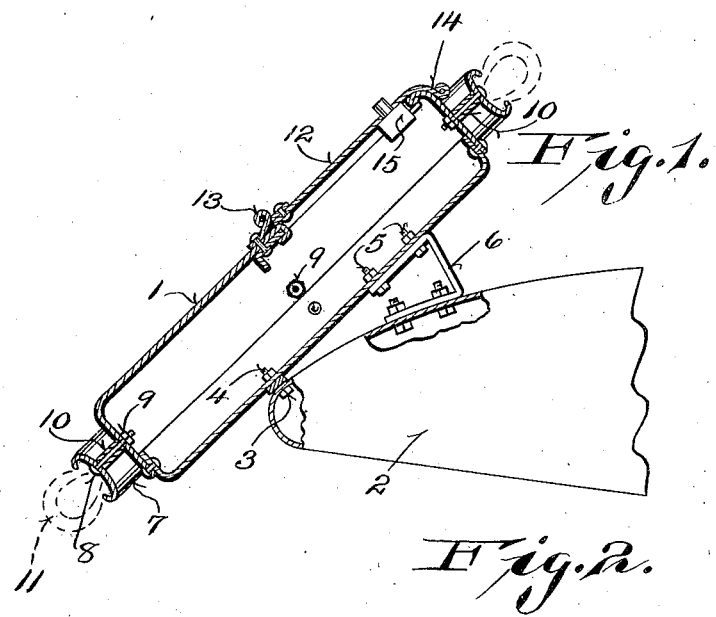
Figure 2:
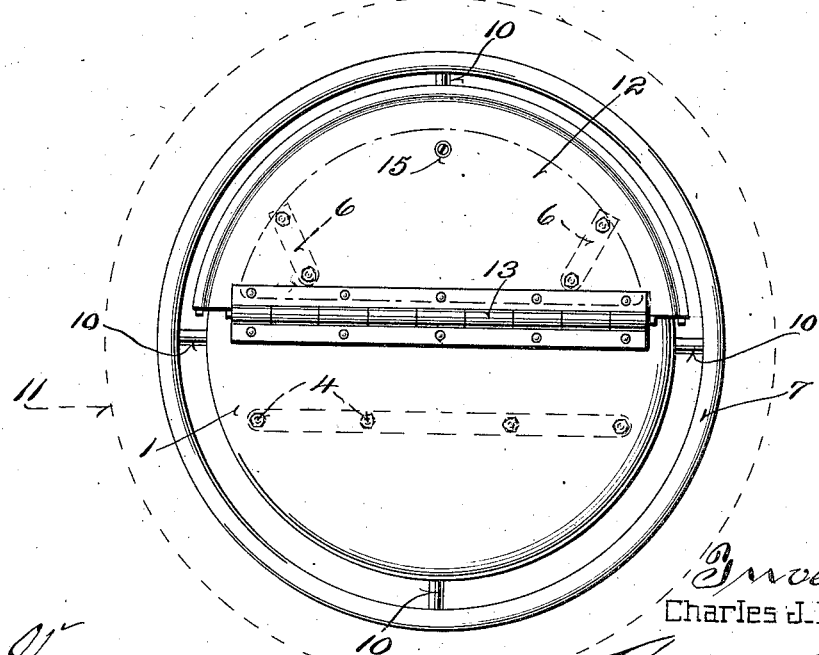

Referring to the accompanying drawing,

Figure 1 is a longitudinal sectional view through the combined receptacle and tire carrier, which is attached to the side car of a motorcycle, and Figure 2 is a plan view of the invention.

The number 1 denotes the luggage receptacle, which is made cylindrical, as shown, and is attached to the rear end of the side car 2, by means of bolts 3, which are inserted from the inside of the car 2 through the bottom wall of the receptacle and secured by the nuts 4, by manipulation from the inside of the receptacle. Other bolts 5 are applied in like manner to secure the receptacle to a bracket 6, which is also secured to the side car.

A demountable rim 7 surrounds the cylindrical wall of the receptacle and is secured by the bolts 8, which are inserted through the rim and secured by nuts 9 on the inside of the cylindrical wall, spacing thimbles 10 being provided for maintaining the rim in suitable spaced relation to the receptacle. The tire 11, which is carried by the rim, conceals the heads of the bolts 8, and the latter may be removed only by removing the nuts 9 from the inside of the receptacle.

The receptacle is provided with a closure 12, which is hinged at 13 and provided with an inwardly extending flange 14 that fits over the cylindrical wall of the receptacle. A lock 15 is provided for securing the closure in its closed position.

From the foregoing description, it will be seen that the invention provides means for carrying a considerable amount of luggage in the space within the rim, which would otherwise be wasted, and the invention also provides means for securing the receptacle and the rim from the inside of the receptacle so that the same cannot be removed except by a person having a key thereto.

I claim as my invention:

In combination, a tire rack and luggage carrier comprising a closed receptacle, a wheel rim encircling the same, a hinged door for providing access to the interior of the receptacle, headed bolts extending through the rim and into the receptacle with the heads located exteriorly of the rim, nuts upon the inner end of said bolts and located within said receptacle, attaching means for securing the receptacle to the vehicle, and a lock for locking the hinged door, said headed nuts being removable radially outwardly and being adapted to be covered by a tire when carried upon said rim.

In testimony that I claim the foregoing I have hereunto set my hand at Milwaukee, in the county of Milwaukee and State of Wisconsin.

CHARLES J. HEPTING.